US012669807B2

(12) United States Patent
Derbyshire et al.

(10) Patent No.: US 12,669,807 B2
(45) Date of Patent: Jun. 30, 2026

(54) SYSTEMS AND METHODS FOR DYNAMICALLY CUSTOMIZING A HUMAN-MACHINE INTERFACE USING OBJECT ORIENTED PROGRAMMING

(71) Applicant: SIMPLICONTROL, INC., Clarkston, MI (US)

(72) Inventors: Andrew Derbyshire, Goodrich, MI (US); Adam Shannon, Madison Heights, MI (US); Scott Selvidge, Clinton Township, MI (US)

(73) Assignee: SIMPLICONTROL, Inc., Clarkston, MI (US)

( * ) Notice: Subject to any disclaimer, the term of this patent is extended or adjusted under 35 U.S.C. 154(b) by 742 days.

(21) Appl. No.: 18/078,563

(22) Filed: Dec. 9, 2022

(65) Prior Publication Data

US 2023/0195084 A1 Jun. 22, 2023

Related U.S. Application Data

(60) Provisional application No. 63/291,514, filed on Dec. 20, 2021.

(51) Int. Cl.
*G05B 19/418* (2006.01)
(52) U.S. Cl.
CPC ... *G05B 19/4183* (2013.01); *G05B 19/41865* (2013.01)
(58) Field of Classification Search
USPC ........................................... 700/116
See application file for complete search history.

(56) References Cited

U.S. PATENT DOCUMENTS 4,359,319 A * 11/1982 Greco .................. G09B 19/003
                                                434/224
5,493,767 A * 2/1996 Susnjara .............. B23Q 16/001
                                                144/144.1
(Continued)

FOREIGN PATENT DOCUMENTS

EP        1170648 A1    1/2002
EP        150693 A2 *   9/2005
(Continued)

OTHER PUBLICATIONS

Notification of Transmittal of the International Search Report and the Written Opinion of the International Searching Authority, or the Declaration, in corresponding PCT Application No. PCT/US2022/052381 (Apr. 20, 2023).

*Primary Examiner* — Hien D Khuu
(74) *Attorney, Agent, or Firm* — Burris Law, PLLC

(57) ABSTRACT

A method includes obtaining, using a human-machine interface (HMI), a first input corresponding to a selection of an image of a workpiece stored in a relational database and one or more workpiece parameters, where the one or more workpiece parameters include sequence information, workpiece option information, operator instruction information, or a combination thereof. The method includes obtaining, using the HMI, a second input corresponding to a selection of one or more fixture indicators and one or more fixture indicator parameters. The method includes superimposing, using the HMI, the one or more fixture indicators on the image of the workpiece based on the second input to generate a workpiece instruction image and generating an object from among a plurality of objects stored in the relational database based on a predefined class associated with the plurality of workpieces, the first input, and the workpiece instruction image.

20 Claims, 5 Drawing Sheets

(56)                    References Cited

U.S. PATENT DOCUMENTS

| | | | | |
|---|---|---|---|---|
| 6,847,922 | B1 * | 1/2005 | Wampler, II | G05B 19/4069 |
| | | | | 700/251 |
| 8,269,830 | B1 * | 9/2012 | Delaney | G06T 7/001 |
| | | | | 348/126 |
| 10,739,231 | B2 * | 8/2020 | Ogawa | G01M 13/02 |
| 2006/0221351 | A1 * | 10/2006 | Yu | H04N 23/635 |
| | | | | 348/E5.025 |
| 2009/0244296 | A1 * | 10/2009 | Petrescu | H04N 23/63 |
| | | | | 348/E5.025 |
| 2014/0114458 | A1 * | 4/2014 | Miyata | G06F 30/17 |
| | | | | 700/98 |
| 2015/0106632 | A1 * | 4/2015 | Karame | H04L 9/0894 |
| | | | | 713/193 |
| 2019/0250592 | A1 * | 8/2019 | Sadri | G05B 19/401 |
| 2019/0385377 | A1 * | 12/2019 | Rueb | H04N 9/3129 |
| 2020/0133225 | A1 * | 4/2020 | Hada | G05B 19/19 |
| 2020/0302642 | A1 * | 9/2020 | Hashimoto | H04N 5/445 |

FOREIGN PATENT DOCUMENTS

| | | | | |
|---|---|---|---|---|
| EP | 2902862 | A1 * | 8/2015 | |
| EP | 3529178 | B1 * | 12/2020 | |
| EP | 3696630 | B1 * | 11/2021 | |

* cited by examiner

SYSTEMS AND METHODS FOR DYNAMICALLY CUSTOMIZING A HUMAN-MACHINE INTERFACE USING OBJECT ORIENTED PROGRAMMING

CROSS-REFERENCE TO RELATED APPLICATION

This application claims priority to U.S. provisional application No. 63/291,514 filed on Dec. 20, 2021. The disclosure of the above application is incorporated herein by reference.

FIELD

The present disclosure relates to systems and methods for dynamically customizing a human-machine interface (HMI).

BACKGROUND

The statements in this section merely provide background information related to the present disclosure and may not constitute prior art.

HMIs may be provided at various workstations of a manufacturing environment to assist operators while performing manufacturing routines for a given article (e.g., a vehicle component, electronic devices, etc.). As an example, a given application state of the HMI may display text and other user interface elements configured to instruct a user to load workpieces onto a fixture (e.g., a uniaxial locator, a biaxial locator, and/or a planar locator), verify that the workpiece is aligned with the fixture, and initiate an automated manufacturing transformation on the workpiece or perform a manual manufacturing transformation on the workpiece.

However, manufacturing routines may include numerous variations of the workpiece and/or the manufacturing routine, thereby requiring a programmer to define numerous application states of the HMI for each variation of the workpiece and/or manufacturing routine. Furthermore, the manufacturing routine and/or workpieces may be subjected to dynamic variations (e.g., variations to a sequence/type of manufacturing routine, custom workpieces and/or custom manufacturing transformations associated with the custom workpieces, among others) that are not accounted for by the programmer when defining the application states of the HMI. The present disclosure addresses these issues with defining application states of the HMI, among other issues.

SUMMARY

This section provides a general summary of the disclosure and is not a comprehensive disclosure of its full scope or all of its features.

The present disclosure provides a method for defining a manufacturing routine of a plurality of workpieces using an object-oriented programming routine. The method includes obtaining, using a human-machine interface (HMI), a first input corresponding to a selection of an image of a workpiece stored in a relational database and one or more workpiece parameters, where the one or more workpiece parameters include sequence information, workpiece option information, operator instruction information, or a combination thereof. The method includes obtaining, using the HMI, a second input corresponding to a selection of one or more fixture indicators and one or more fixture indicator parameters, where the one or more fixture indicator parameters include a number of the one or more fixture indicators and a location of the one or more fixture indicators. The method includes superimposing, using the HMI, the one or more fixture indicators on the image of the workpiece based on the second input to generate a workpiece instruction image and generating an object from among a plurality of objects stored in the relational database based on a predefined class associated with the plurality of workpieces, the first input, and the workpiece instruction image.

In one form, the method includes instructing the HMI to generate and display one or more application states based on the plurality of objects.

The present disclosure also provides a system for controlling a manufacturing routine of a plurality of workpieces using an object-oriented programming routine. The system includes a processor and a nontransitory computer-readable medium including instructions that are executable by the processor. The instructions include obtaining, using a human-machine interface (HMI), a first input corresponding to a selection of an image of a workpiece stored in a relational database and one or more workpiece parameters, where the one or more workpiece parameters include sequence information, workpiece option information, operator instruction information, or a combination thereof. The instructions include obtaining, using the HMI, a second input corresponding to a selection of one or more fixture indicators and one or more fixture indicator parameters, where the one or more fixture indicator parameters include a number of the one or more fixture indicators and a location of the one or more fixture indicators. The instructions include superimposing, using the HMI, the one or more fixture indicators on the image of the workpiece based on the second input to generate a workpiece instruction image and generating an object from among a plurality of objects stored in the relational database based on a predefined class associated with the plurality of workpieces, the first input, and the workpiece instruction image.

In one form, the sequence information indicates a step value of a load sequence associated with the manufacturing routine. In one form, the operator instruction information indicates a manufacturing process associated with the step value. In one form, the workpiece option information indicates a presence of one or more auxiliary components of the workpiece, a type of one or more auxiliary components of the workpiece, or a combination thereof. In one form, the location of the one or more fixture indicators is one of a two-dimensional location of the one or more fixture indicators and a three-dimensional location of the one or more fixture indicators. In one form, the location of the one or more fixture indicators is predefined. In one form, the image includes a digital twin of the workpiece.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4:
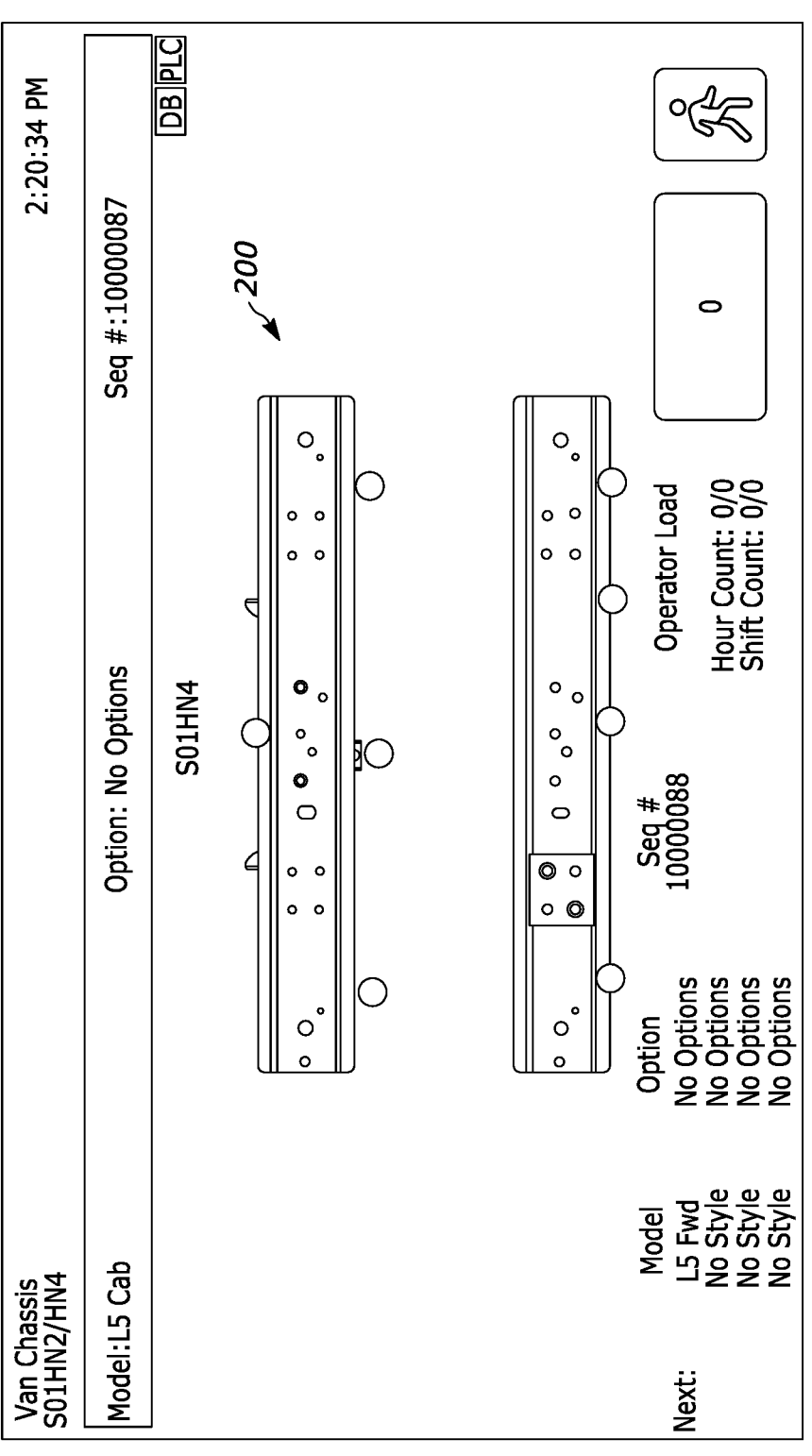
Figure 5:
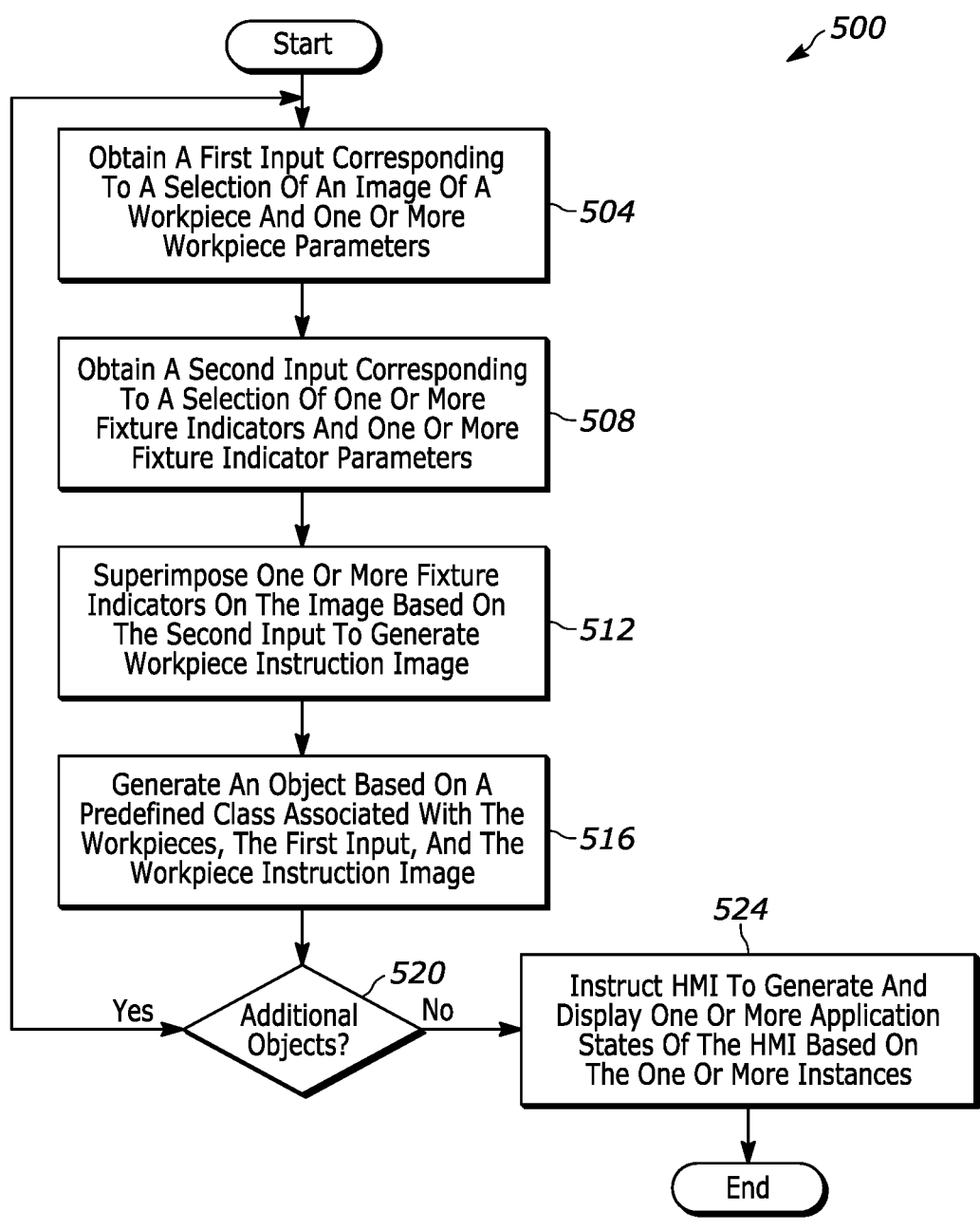

FIG. 4 is a schematic illustration of another example graphical user interface of an HMI of a dynamic manufacturing routine visualization system in accordance with the teachings of the present disclosure; and FIG. 5 illustrates a routine for defining and performing a manufacturing routine of a plurality of workpieces using an object-oriented programming (OOP) routine in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a dynamic manufacturing routine visualization system that enables an operator to dynamically define application states of the HMI. To dynamically generate an application state, the operator selects an image of the workpiece, one or more workpiece parameters, one or more fixture indicators, and one or more fixture indicator parameters using the HMI. In response to receiving the selections from the operator, an object-oriented programming (OOP) module generates a workpiece instruction image by superimposing the fixture indicators on the image. The OOP module also generates an object stored in a relational database based on a predefined class associated with a plurality of workpieces, the selected workpiece/ workpiece parameters, and the workpiece instruction image. As such, the operator can dynamically define, using the HMI, various application states associated with dynamic variations to the manufacturing routine and/or workpieces and without repurposing/redefining software instructions of a nontransitory computer-readable medium (i.e., scripting, compiling, and/or textual logical programming the software instructions). Accordingly, the dynamic manufacturing routine visualization system reduces or inhibits the time and resources needed to dynamically define various applications states associated with dynamic variations to the manufacturing routine and/or workpieces.

As used herein, an "OOP routine" refers to source code that is organized as a plurality of objects that are defined based on one or more classes. In one form, the OOP routine may include source code written using syntax from OOP languages including, but not limited to, Ruby, Scala, JADE, Emerald, Java®, Python®, Visual Basic®, C++, or Smalltalk.

As used herein, a "class" refers to a block of source code representing a template for defining objects. As an example, the class defines names, types, ranges, and/or default values of data elements (e.g., attributes) and various operations (e.g., methods) of an object. Example operations include, but are not limited to, manipulation of stored data, control of the HMI, and broadcasting a message configured to invoke methods of other objects. As used herein, an "object" refers to an instance of the class and includes defined parameters/ values of the data elements and defined operations.

In one form, OOP routines provide for abstraction (e.g., objects are defined to selectively group data elements and methods), encapsulation (e.g., objects selectively provide access to only a set of relevant data elements/methods), inheritance (e.g., newly created classes can reuse instructions from other classes), and polymorphism (e.g., objects can include similar methods and data elements and respond to a message in different manners).

Figure 1:
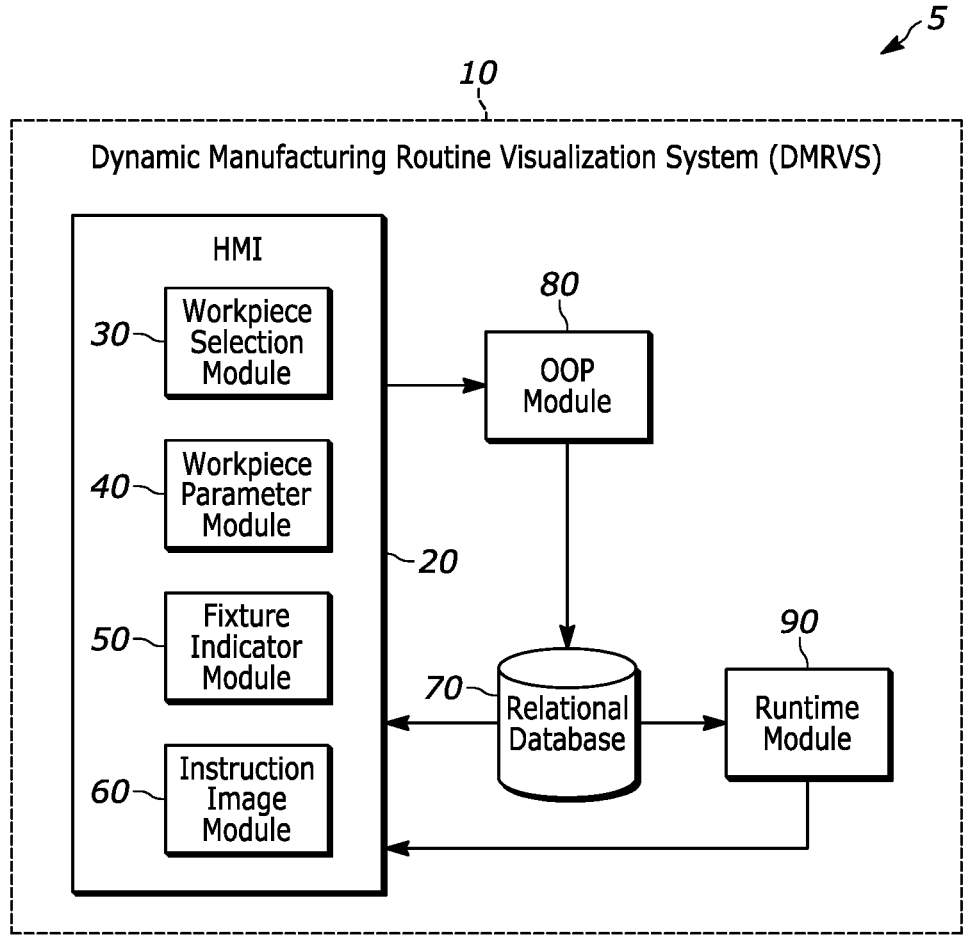
FIG. 1 is a block diagram of a dynamic manufacturing routine visualization system in accordance with the teachings of the present disclosure.

Referring to FIG. 1, a dynamic manufacturing routine visualization system (DMRVS) 10 of a manufacturing environment 5 is provided and generally includes a human-machine interface (HMI) 20, a relational database 70, an OOP module 80, and a runtime module 90. It should be readily understood that any one of the components of the DMRVS 10 can be provided at the same location or distributed at different locations (e.g., via one or more edge computing devices) and communicably coupled accordingly (e.g., the components are provided at the same location and are coupled based on a structured query language (SQL) protocol). In one form, the components of the DMRVS 10 are communicably coupled using a wired and/or wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the HMI 20 includes a workpiece selection module 30, a workpiece parameter module 40, a fixture indicator module 50, and an instruction image module 60. To perform the functionality described herein, the HMI 20 (e.g., a touchscreen display, monitor, among others) may include input devices (e.g., mouse, keyboard, user-selectable graphical user interface (GUI) elements, among others) that enable an operator to generate inputs corresponding to the functionality described herein.

Figure 2:
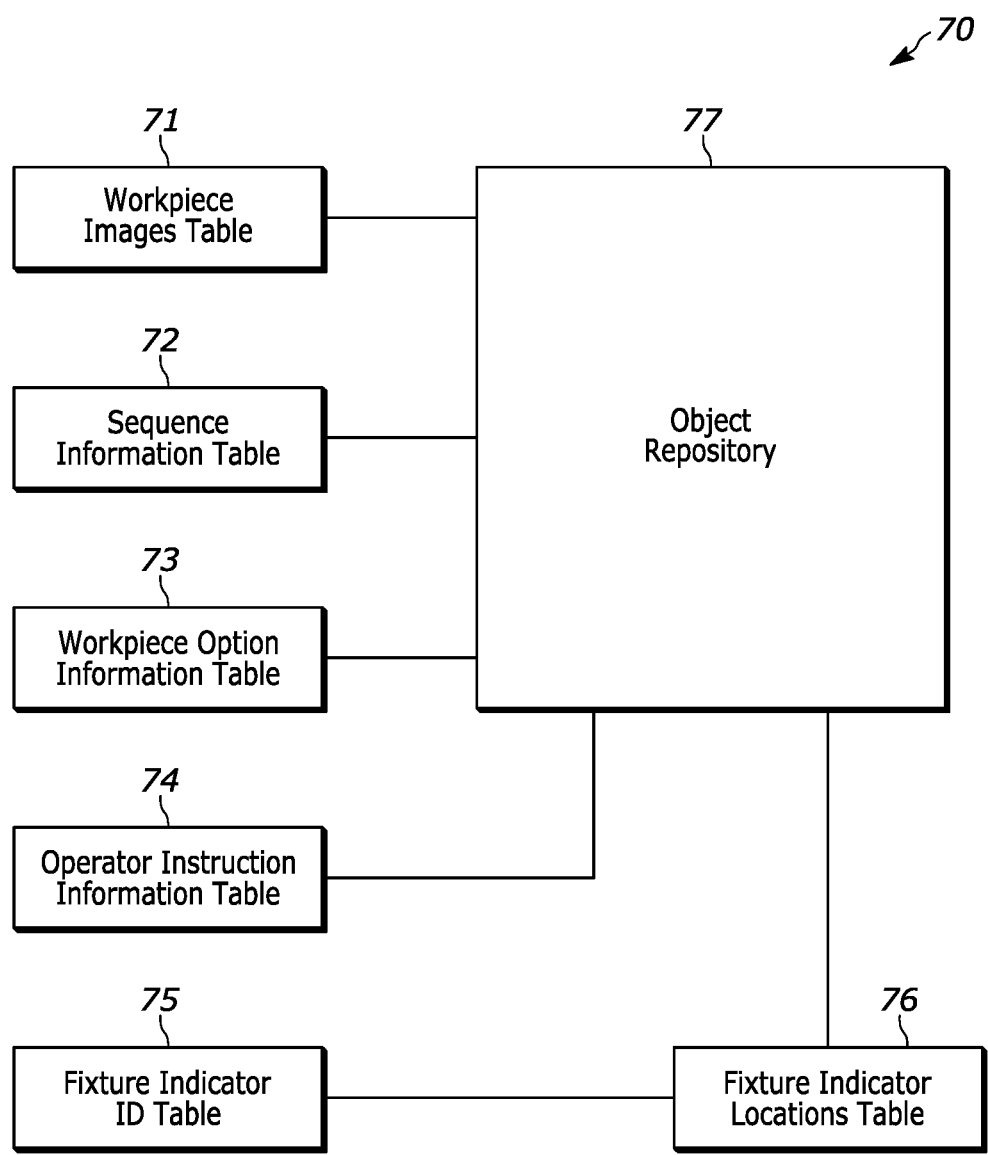
FIG. 2 is a block diagram of a relational database of a dynamic manufacturing routine visualization system in accordance with the teachings of the present disclosure.

In one form and referring to FIGS. 1-2, the relational database 70 includes a plurality of tables having logical relationships that are based on primary and foreign keys. In one form, the primary and foreign keys collectively represent images of a workpiece, workpiece parameters, fixture indicators, and fixture indicator parameters. As used herein, "primary key" refers to a set of columns in a table whose values uniquely identify a row in the table (e.g., an identification number), and "foreign key" refers to a set of columns in a table whose values correspond to the values of the primary key in another table.

As an example and as shown in FIG. 2, the relational database 70 includes a workpiece images table 71, a sequence information table 72, a workpiece option information table 73, an operator instruction information table 74, a fixture indicator identification number table 75, a fixture indicator location table 76 (collectively referred to hereinafter as "the predefined class"), and an object repository 77. Specifically, the object repository 77 may have foreign keys corresponding to the primary keys of the workpiece images table 71, the sequence information table 72, the workpiece option information table 73, the operator instruction information table 74, and the fixture indicator location table 76. Furthermore, the fixture indicator location table 76 may have a foreign key corresponding to the fixture indicator identification number table 75. As described below in further detail, the OOP module 80 is configured to generate one or more objects of the object repository 77 by performing various relational operations on the predefined class based on the inputs received via the workpiece selection module 30, the workpiece parameter module 40, and/or the fixture indicator module 50.

In one form, the workpiece selection module 30 obtains an input corresponding to a selection of an image of a workpiece stored in the workpiece images table 71 of the relational database 70. In some forms, the images stored in the workpiece images table 71 further include a fixture associated with the given workpiece. In one form, each image of the workpiece is identified by a given primary key of the workpiece images table 71 and is stored as a row in the workpiece images table 71.

In one form, the image of the workpiece is obtained from an image sensor, such as a two-dimensional (2D) camera, a three-dimensional (3D) camera, a red-green-blue (RGB) camera, a stereo vision camera, an infrared sensor, a radar scanner, a laser scanner, and/or a light detection and ranging (LIDAR) sensor, among other image sensors. In one form, the image includes a digital twin of the component. As used herein, a "digital twin" may refer to a virtual representation of various workpieces of the manufacturing environment 5. The virtual representation may be, for example, a 2D/3D model of the workpiece (e.g., a computer-aided design (CAD) model), a synthetic image of the workpiece, among other types of virtual representations of the workpiece. As an example and as shown in FIG. 3, the workpiece selection module 30 obtains an input corresponding to the selection of image 100 representing a given workpiece in response to an operator manipulation of image selection GUI element 110.

In one form, the workpiece parameter module 40 is configured to obtain an input from an operator corresponding to a selection of one or more workpiece parameters of the given workpiece. Example workpiece parameters include, but are not limited to, sequence information, workpiece option information, and/or operator instruction information. As used herein, "sequence information" refers to a step value of a load sequence associated with a manufacturing routine, and "step value of a load sequence" refers to a value of a sequence of a manufacturing routine in which the given workpiece is loaded onto a fixture. As used herein, "operator instruction information" indicates a manufacturing process associated with the step value, and "workpiece option information" refers to a presence of one or more auxiliary components of the workpiece, a type of one or more auxiliary components of the workpiece (e.g., B-pillar, bolt/nut plates for fastening interior components, frame cross-members, dash components, power window motors, among others), or a combination thereof. It should be understood that other types of auxiliary components and/or workpieces may be provided and are not limited to the automotive-based auxiliary components and/or workpieces described herein.

Figure 3:
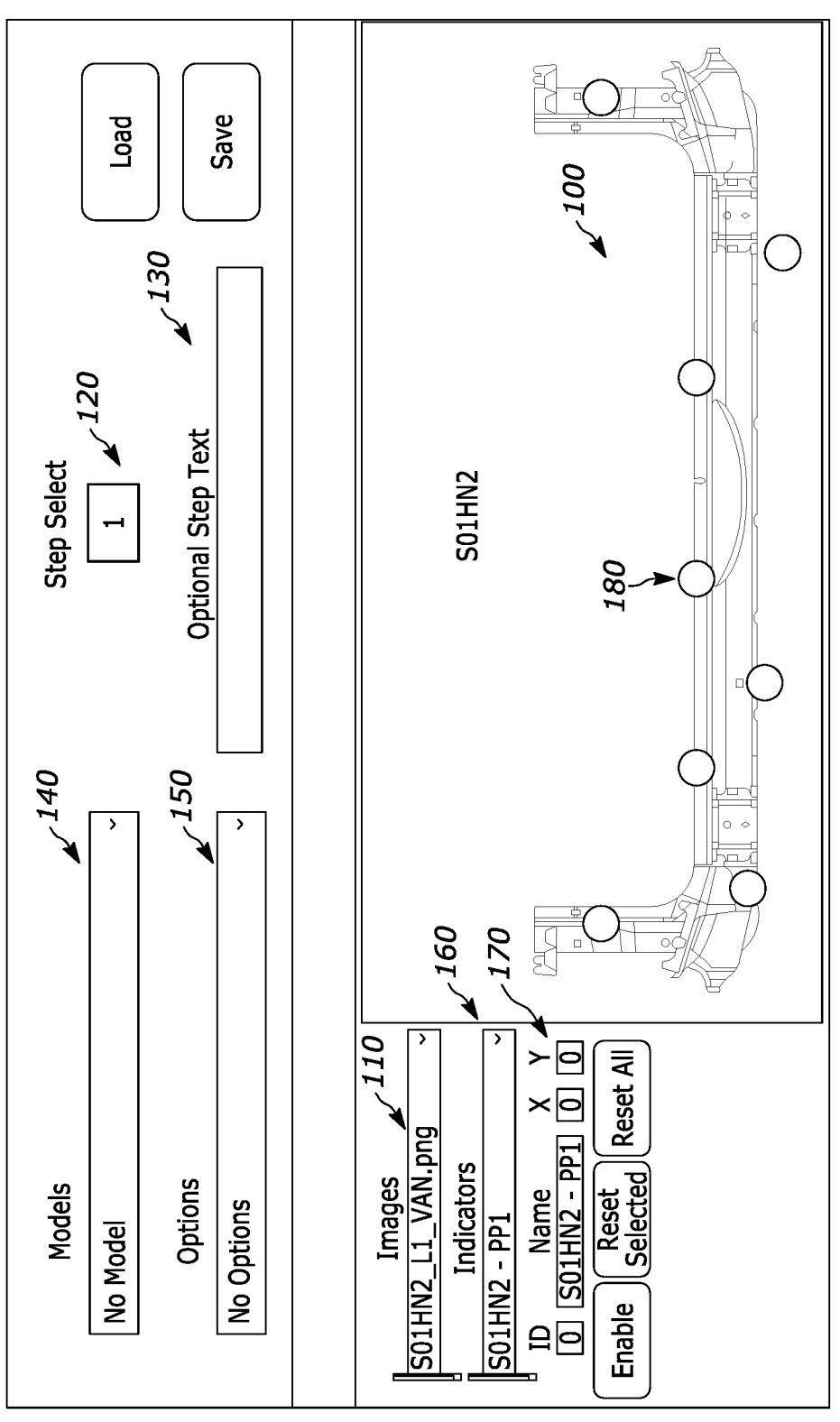
FIG. 3 is a schematic illustration of an example graphical user interface of an HMI of a dynamic manufacturing routine visualization system in accordance with the teachings of the present disclosure.

As an example and as shown in FIG. 3, the workpiece parameter module 40 obtains an input corresponding to the step value in response to an operator manipulation of sequence information GUI element 120. Furthermore, the workpiece parameter module 40 obtains an input corresponding to the operator instruction information in response to an operator manipulation of operator instruction GUI element 130. Additionally, the workpiece parameter module 40 obtains an input corresponding to the workpiece option information in response to an operator manipulation of workpiece option GUI elements 140, 150.

In one form, the fixture indicator module 50 is configured to obtain an input from an operator corresponding to a selection of one or more fixture indicators and one or more corresponding parameters. In one form, the fixture indicators are digital twins of fixture sensors (e.g., resistive pressure sensors, capacitive pressure sensors, piezoelectric sensors, among others) that are disposed on a fixture associated with the given workpiece and configured to output a signal indicating an alignment that is based on a detected force/applied pressure. In one form, the fixture indicator parameters include a number and/or location (e.g., a 2D and/or 3D location, a predefined location, and/or a dynamically defined location) of fixture indicators. As an example and as shown in FIG. 3, the fixture indicator module 50 obtains an input corresponding to the selection of one or more fixture indicators 180 and one or more corresponding parameters in response to an operator manipulation of fixture indicator GUI elements 160, 170.

In one form, the instruction image module 60 is configured to superimpose the one or more fixture indicators 180 onto the image 100 to generate a workpiece instruction image. As an example and as shown in FIG. 4, the instruction image module 60 is configured to perform known superimposition routines to combine the digital twins of the fixture sensors (i.e., the one or more fixture indicators 180) and the image of the workpiece (i.e., the image 100) to generate workpiece instruction image 200.

In one form, the OOP module 80 is configured to generate and store an object in the object repository 77 of the relational database 70 based on a predefined class associated with the workpieces, the selected workpiece, the workpiece parameters, and the workpiece instruction image. In one form, the OOP performs various relational operations on the predefined class (e.g., a selection operation, a projection operation, a set-difference operation, a union operation, and/or a cross-product/cartesian product operation) to selectively combine the workpieces, the selected workpiece, the workpiece parameters, and the workpiece instruction image and store the resulting object in the object repository 77. In one form, the OOP module 80 stores the object in the object repository 77 and assigns the objects a primary key such that the step values of the objects (as indicated by the workpiece parameters) are sequentially ordered.

In one form, the runtime module 90 is configured to instruct the HMI 20 to generate and display one or more application states corresponding to the one or more objects of the object repository 77. As an example, the runtime module 90 instructs the HMI 20 to sequentially display a plurality of application states based on the primary keys of the object repository 77. As another example, the runtime module 90 instructs the HMI 20 to generate an application state that includes an adjusted color, size, and/or shape of the fixture indicators 180 based on the signal output by the corresponding fixture sensors (e.g., the fixture indicators 180 display a first color when the fixture sensor indicates the workpiece is properly aligned with the given fixture sensor and a second color when the workpiece is improperly aligned with the given fixture sensor).

Referring to FIG. 5, a routine 500 for defining and performing a manufacturing routine of a plurality of workpieces using OOP routines is shown. At 504, the workpiece selection module 30 and the workpiece parameter module 40 obtain a first input corresponding to a selection of an image of a workpiece stored in the relational database 70 and one or more workpiece parameters (e.g., sequence information, workpiece option information, operator instruction information, or a combination thereof). At 508, the fixture indicator module 50 obtains a second input corresponding to a selection of one or more fixture indicators and one or more fixture indicator parameters. At 512, the instruction image module 60 superimposes the one or more fixture indicators on the image of the workpiece based on the second input to generate a workpiece instruction image. At 516, the OOP module 80 generates and stores an object based on a predefined class associated with the plurality of workpieces, the first input, and the workpiece instruction image. At 520, the runtime module 90 determines whether additional objects need to be defined. If so, the routine 500 proceeds to 504. Otherwise, the routine 500 proceeds to 524, where the runtime module 90 instructs the HMI 20 to generate and display one or more application states of the HMI 20 based on the one or more objects stored in the relational database 70.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and nontransitory. Non-limiting examples of a nontransitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for defining a manufacturing routine of a plurality of workpieces using an object-oriented programming routine, the method comprising:

obtaining, using a human-machine interface (HMI), a first input corresponding to a selection of an image of a workpiece stored in a relational database and one or more workpiece parameters, wherein the one or more workpiece parameters include sequence information, workpiece option information, operator instruction information, or a combination thereof;

obtaining, using the HMI, a second input corresponding to a selection of one or more fixture indicators and one or more fixture indicator parameters, wherein the one or more fixture indicator parameters include a number of the one or more fixture indicators and a location of the one or more fixture indicators;

superimposing, using the HMI, the one or more fixture indicators on the image of the workpiece based on the second input to generate a workpiece instruction image;

generating an object by performing a relational operation on a predefined class associated with the plurality of workpieces, the first input, and the workpiece instruction image, wherein the predefined class comprises a workpiece images table, a sequence information table, a workpiece option information table, an operator instruction information table, a fixture indicator identification number table, and a fixture indicator location table; and storing the object in an object repository of the relational database, wherein the object repository comprises foreign keys corresponding to primary keys of the workpiece images table, the sequence information table, the workpiece option information table, the operator instruction information table, and the fixture indicator location table.

2. The method of claim 1, wherein the sequence information indicates a step value of a load sequence associated with the manufacturing routine.

3. The method of claim 2, wherein the operator instruction information indicates a manufacturing process associated with the step value.

4. The method of claim 1, wherein the workpiece option information indicates a presence of one or more auxiliary components of the workpiece, a type of one or more auxiliary components of the workpiece, or a combination thereof.

5. The method of claim 1, wherein the location of the one or more fixture indicators is one of a two-dimensional location of the one or more fixture indicators and a three-dimensional location of the one or more fixture indicators.

6. The method of claim 1, wherein the location of the one or more fixture indicators is predefined.

7. The method of claim 1, wherein the image includes a digital twin of the workpiece.

8. A system for controlling a manufacturing routine of a plurality of workpieces using an object-oriented programming routine, the system comprising:

a processor; and a nontransitory computer-readable medium including instructions that are executable by the processor, wherein the instructions include:

obtaining, using a human-machine interface (HMI), a first input corresponding to a selection of an image of a workpiece stored in a relational database and a plurality of workpiece parameters, wherein the plurality of workpiece parameters include sequence information, workpiece option information, and operator instruction information;

obtaining, using the HMI, a second input corresponding to a selection of one or more fixture indicators and one or more fixture indicator parameters, wherein the one or more fixture indicator parameters include a number of the one or more fixture indicators and a location of the one or more fixture indicators;

superimposing, using the HMI, the one or more fixture indicators on the image of the workpiece based on the second input to generate a workpiece instruction image;

generating an object by performing a relational operation on a predefined class associated with the plurality of workpieces, the first input, and the workpiece instruction image, wherein the predefined class comprises a workpiece images table, a sequence information table, a workpiece option information table, an operator instruction information table, a fixture indicator identification number table, and a fixture indicator location table; and storing the object in an object repository of the relational database, wherein the object repository comprises foreign keys corresponding to primary keys of the workpiece images table, the sequence information table, the workpiece option information table, the operator instruction information table, and the fixture indicator location table.

9. The system of claim 8, wherein the sequence information indicates a step value of a load sequence associated with the manufacturing routine.

10. The system of claim 9, wherein the operator instruction information indicates a manufacturing process associated with the step value.

11. The system of claim 8, wherein the workpiece option information indicates a presence of one or more auxiliary components of the workpiece, a type of one or more auxiliary components of the workpiece, or a combination thereof.

12. The system of claim 8, wherein the location of the one or more fixture indicators is one of a two-dimensional location of the one or more fixture indicators and a three-dimensional location of the one or more fixture indicators.

13. The system of claim 8, wherein the location of the one or more fixture indicators is predefined.

14. The system of claim 8, wherein the image includes a digital twin of the workpiece.

15. A method for defining and performing a manufacturing routine of a plurality of workpieces using an object-oriented programming routine, the method comprising:

obtaining, using a human-machine interface (HMI), a first input corresponding to a selection of an image of a workpiece stored in a relational database and one or more workpiece parameters, wherein the one or more workpiece parameters include sequence information, workpiece option information, and operator instruction information;

obtaining, using the HMI, a second input corresponding to a selection of one or more fixture indicators and one or more fixture indicator parameters, wherein the one or more fixture indicator parameters include a number of the one or more fixture indicators and a location of the one or more fixture indicators;

superimposing, using the HMI, the one or more fixture indicators on the image of the workpiece based on the second input to generate a workpiece instruction image;

generating an object by performing a relational operation on a predefined class associated with the plurality of workpieces, the first input, and the workpiece instruction image, wherein the predefined class comprises a workpiece images table, a sequence information table, a workpiece option information table, an operator instruction information table, a fixture indicator identification number table, and a fixture indicator location table, and wherein the relational operation is one of a selection operation, a projection operation, a set-difference operation, a union operation, or a cross-product operation;

instructing the HMI to generate and display one or more application states based on the object; and storing the object in an object repository of the relational database, wherein the object repository has foreign keys corresponding to primary keys of the workpiece images table, the sequence information table, the workpiece option information table, the operator instruction information table, and the fixture indicator location table.

16. The method of claim 15, wherein the sequence information indicates a step value of a load sequence associated with the manufacturing routine.

17. The method of claim 15, wherein the workpiece option information indicates a presence of one or more auxiliary components of the workpiece, a type of one or more auxiliary components of the workpiece, or a combination thereof.

18. The method of claim 15, wherein the location of the one or more fixture indicators is one of a two-dimensional location of the one or more fixture indicators and a three-dimensional location of the one or more fixture indicators.

19. The method of claim 15, wherein the location of the one or more fixture indicators is predefined.

20. The method of claim 15, wherein the image includes a digital twin of the workpiece.

\* \* \* \* \*